United States Patent [19]

Fujinawa et al.

[11] Patent Number: 4,937,681
[45] Date of Patent: Jun. 26, 1990

[54] PICTURE CODING SYSTEM FOR DOCUMENT IMAGE

[75] Inventors: Masaaki Fujinawa, Tokyo; Hiromichi Fujisawa, Tokorozawa; Tatsuya Murakami, Tachikawa, all of Japan

[73] Assignee: Hitachi, Ltd., Tokyo, Japan

[21] Appl. No.: 347,220

[22] Filed: May 4, 1989

[30] Foreign Application Priority Data

May 6, 1988 [JP] Japan ................... 63-108997

[51] Int. Cl.$^5$ .............................................. H04N 1/41
[52] U.S. Cl. ................................ 358/426; 358/261.3
[58] Field of Search ................... 358/426, 261.3, 442, 358/427, 428, 432; 392/86

[56] References Cited

U.S. PATENT DOCUMENTS

| 4,633,326 | 12/1986 | Endoh et al. | 358/442 |
| 4,682,215 | 7/1987 | Adachi | 358/426 |
| 4,729,034 | 3/1988 | Roberts et al. | 358/426 |

Primary Examiner—Edward L. Coles, Sr.
Attorney, Agent, or Firm—Antonelli, Terry, Stout & Kraus

[57] ABSTRACT

A picture coding system for a document image data in which a plurality of picture coding methods are subjected to a selection such that document image data is converted so as to obtain an identification code representing the selected coding method and signals obtained by coding the data. The system includes units for detecting and for accumulating code lengths of the codes converted in the respective coding methods, units for detecting and for accumulating a difference between the lengths of the respective codes obtained by the conversion achieved in the coding methods, a storage for storing therein a history of a result of the selection of the preceding coding method, and a change-over judge unit for selecting one of the plural coding methods based on information obtained from the three kinds of units.

13 Claims, 7 Drawing Sheets

| SUM OF CODE WORDS | HISTORY (PRECEDING MODE) | DIFFERENT CODE WORD (Diff) | | | | | |
|---|---|---|---|---|---|---|---|
| | | $\text{Diff} < -I_1-I_2$ | $-I_1-I_2 \leq \text{Diff} \leq -I_2$ | $-I_2 < \text{Diff} \leq 0$ | $0 < \text{Diff} < I_1$ | $I_1 \leq \text{Diff} \leq I_1+I_2$ | $I_1+I_2 < \text{Diff}$ |
| SUM OF CODE WORDS $\geq$ Buff | UNCOMPRESSED MODE | COMPRESSED MODE | | UNCOMPRESSED MODE | | | |
| | COMPRESSED MODE | COMPRESSED MODE | | RESERVATION | UNCOMPRESSED MODE | | |
| SUM OF CODE WORDS $<$ Buff | UNCOMPRESSED MODE | COMPRESSED MODE | | | | RESERVATION | UNCOMPRESSED MODE |
| | COMPRESSED MODE | COMPRESSED MODE | | | | | UNCOMPRESSED MODE |

$\text{Diff} : \sum_{i=K}^{N} D_i$ $I_1$ : ENTRY CODE1
$I_2$ : EXIT CODE2

PICTURE CODING SYSTEM FOR DOCUMENT IMAGE

BACKGROUND OF THE INVENTION

The present invention relates to a coding system of a document image, and in particular, to a coding system for improving a data compression efficiency in an operation to code a pseudo halftone picture which is a continuous-tone picture represented with binary values associated with black and white.

Conventionally, there has been discussed a high-efficiency coding of a binary picture or image to be primarily employed in a high-speed facsimile. As for the highly efficient coding methods of the facsimile, there have been broadly adopted the modified Huffmann (MH) coding system and the modified relative element address designate (MR) coding system stipulated according to the international standards with respect to the compatibility and the communicability. These coding systems are widely utilized in the facsimile communication as well as other operations such as filing of document images.

The MH coding system is a one-dimensional coding system in which run lengths of black and white are subjected to a variable length coding by paying attention to a scanning line so as to effect a one-dimensional coding. The run length here indicates the length of the black or white pixels successively arranged in the scanning line direction. The MH coding system is a twodimensional coding system in which the coding is achieved by paying attention to a contour of a boundary line with respect to black and white between a scanning line to be coded and a reference scanning line immediately thereabove.

These coding systems have been stipulated on assumption of applications of the ordinary document images and drawings so as to establish matching with the static characteristics thereof. However, there exist many document images or pictures which do not conform thereto. For example, these images include a screened photograph having a fine periodic pattern therein and a dithed image with a characteristic periodic pattern generated by a computer. When the MH or MR coding system is applied to these images, the coding efficiency is lowered, and in an extreme case, the number of code bits thus obtained exceeds that of the pixels.

In order to avoid such a disadvantage, there exists an adaptive coding/direct change-over system in which the coding is not effected in a region of a fine image so as to directly transmit a series of the pixels. The prior art related to this system has been described, for example, in the JP-A No. 50-3713 "A Coding Method for Binary Signals", Fukinuki. The uncompressed mode in the international standards of the facsimile is also one of the coding systems. Details thereabout has been stipulated in the Recommendation T.6 of the Comité Consulatif International Telegraphique et Telephinique (CCITT).

When the operation is switched to the uncompressed mode, there is inserted an identification code word (0000001111, ten bits). When the uncompressed mode is released, there is inserted another identification code word (0000001T; eight bits, T=Additional bit indicating a color of the run, namely, 1 for black and 0 for white). In consequence, if there frequently occurs a change-over between the compressed mode and the uncompressed mode, the total amount of codes (the number of code bits attained by the coding operation) is undesirably increased. To overcome this difficulty, there has been proposed a mode change-over judging method which does not lead to an increase of the amount of the codes.

One of such methods is a code length monitor method or code word detecting method in which each code length is monitored for judgment of the mode change-over (PROC, ANN, Meeting of IECE (in Japan)). In this method, the judgment is conducted through the following procedure.

(1) In a case where the MH (MR) coding is achieved (in the compressed mode), if the next run length is great and the MH (MR) code includes bits less than the code length thereof in the uncompressed mode, the MH (MR) code system is adopted for the coding operation.

(2) In contrary, when the MH (MR) code includes bits greater than the code length thereof in the uncompressed mode, the coding operation is reserved and the difference between the code lengths of the respective modes is consecutively accumulated. Only when the difference exceeds the total (18 bits) of the identification code words, the operation is changed over to the uncompressed mode.

(3) After the operation is changed over to the uncompressed mode, the judgment is conducted by replacing the compressed mode with the uncompressed mode.

However, when it is desired to implement the code length monitor method in which the code length is monitored for the judgment of the mode change-over, there arises a long reservation period of time associated with the coding operation as described in Article 2 above; in consequence, there appears a situation where the coding operation cannot be effected for a long period of time. In the worst case, the coding mode cannot be determined even at a stage where a page of document image has been coded. In consequence, the processing time required for the coding operation is increased and hence a large capacity is necessary for the buffer memory to store the coded data associated with both modes.

There exists another mode judge method in which the compressed and uncompressed modes are judged depending on a characteristic of a dithered image. There has been proposed a method in which the run length is employed as the characteristic of the image (PROC, ANN, Meeting of IECE (in Japan)).

In this method, when a combination of the run lengths 1 and 1 or 1 and 3 continuously appears several times, the operation transition takes place to the uncompressed mode. For example, the consecutive appearance count is set to two as the reference for the judgment.

Furthermore, when the number of detections of a long run exceeds a predetermined number, the operation transition takes place to the compressed mode. For example, the reference for the judgment is set to a point of time when a run having a run length of eight appears once or when a run having a run length equal to or more than four appears at least twice.

According to the judging method conducted through a characteristic detection utilizing the characteristic of the dithered image, there does not occur the problem associated with the code length monitor method, namely, the problem of the long coding processing time and the large buffer memory capacity. However, in this judge method conducted through a characteristic detection utilizing the characteristic of the dithered image, the kinds of objective dither operations are restricted. In this situation, the dither method in which there occur many combinations of the run length 1 and 1 or 1 and 3 corresponds to a case of a dithered pattern of the Bayer type associated with an organized dither method of distributed type. In consequence, in a case of a dithered pattern of a vortex type associated with an organized dither method of concentrated type or the clustered-dot ordered dither method, the mode judgment cannot be accomplished in this method. That is, there exists a disadvantage that the objective dither method is limited.

SUMMARY OF THE INVENTION

It is therefore an object of the present invention to provide a coding system in which an image as an object of a mode judgment is not limited and the processing time required for the coding operation as well as the capacity of the buffer memory to store coded data associated with both modes are decreased, thereby removing the problems of the prior art technology.

In order to achieve the object above, according to the present invention, there is provided a coding system for document image data in which a plurality of coding methods are subjected to a selection such that document data is converted so as to obtain an identification code representing the selected code method and signals obtained by coding the data according to the method comprising means for accumulating a code length of codes converted in the respective coding methods, means for accumulating a difference between the lengths obtained by the conversion in the coding methods, means for storing therein a history of a result of the selection of the preceding coding method, and mode judge means for selecting one of the plural coding methods based on information obtained from said three kinds of means.

That is, in order to suppress the occurrence of a long reservation period of time which has been a problem in the code words detecting method, the difference between the code lengths of the respective modes is accumulated; furthermore, the code length itself of each mode is sequentially accumulated so as to monitor the overall code length in the reservation period, thereby achieving the object above.

In addition, description will be given in detail of the principle of the present invention.

Description will be given of a change-over method of changing over between the compressed mode and the uncompressed mode for effectively coding a document image including a screened photograph and a dithered image.

As described above, in the conventional code word detecting method, there occurs a long reservation period of time. In order to improve this situation, there exists a new method in which the code length itself of each mode is sequentially accumulated so as to monitor the overall code word length in the reservation period, thereby effecting the mode change-over to the most suitable mode.

Assume that the length of the code obtained by coding an i-th run length in the compressed mode of the coding method such as the MH or MR coding method is represented as $[RL]i$ and that the length of the code obtained by coding an i-th run length in the uncompressed mode of the coding method is represented as $[UC]i$. Assuming here that the difference between the code lengths of the i-th run length respectively associated with the compressed and uncompressed modes is expressed as Di, then $$Di = [RL] - [UC]i \quad (1)$$

holds.

In the conventional coding monitor method, the mode change-over is achieved only by accumulating the difference Di between the code lengths in the respective modes as represented by the expression (1). Assume here that the change-over mode has been determined for the $(k-1)$th run length. In this situation, when the following conditions are satisfied during an observation of the N runs beginning from the k-th run length, the respective modes are determined as follows.

(1) Uncompressed mode $$\sum_{i=k}^{N} Di > I_1 + I_2 \quad (2)$$

(2) Compressed mode $$\sum_{i=k}^{N} Di < -I_1 - I_2 \quad (3)$$

(3) Reservation $$ABS\left(\sum_{i=k}^{N} Di\right) \leq I_1 + I_2 \quad (4)$$

Where, ABS(X) represents an absolute value of X, $I_1$ is the number of bits of an identifier for a change-over to the uncompressed mode, $I_2$ stands for the number of bits of an identifier for a change-over to the compressed mode, and $I_1$ and $I_2$ are integers.

In other words, when the N runs are observed beginning from the k-th run length, if the condition indicated by the expression (4) appears continuously, the processing time becomes to be increased and a larger buffer capacity is required.

To overcome this difficulty, according to the present invention, the code length itself of each mode described below is accumulated in a sequential fashion so as to monitor the sum of all code words, thereby judging the compressed and uncompressed modes.

(3a) Continuation of reservation $$MAX\left(\sum_{i=k}^{N} [RL]i, \sum_{i=k}^{N} [UC]i\right) < \text{Buff} \quad (5)$$

$$MAX\left(\sum_{i=k}^{N} [RL]i, \sum_{i=k}^{N} [UC]i\right) \geq \text{Buff} \quad (6)$$

Where, MAX($X_1$, $X_2$) represents the greater one of $X_1$ and $X_2$, Buff stands for the capacity of the buffer in the bit units.

If the expression (5) holds and the reservation period continues, the coding mode is determined in consideration of the history of the preceding coding modes as follows.

(3a-1) When the preceding mode is the uncompressed mode (1) Compressed mode

If the preceding mode is the uncompressed mode, when the accumulated value $\Sigma Di$ of the difference between the code lengths becomes to be less than the negative value of the total $(I_1+I_2)$ of the identifiers, the coding mode is changed over to the compressed mode.

$$\sum_{i=k}^{N} Di < -I_1 - I_2 \quad (7)$$

(2) Reservation

In addition, if the preceding coding mode is the uncompressed mode, when the accumulated value $\Sigma Di$ of the difference between the code lengths becomes to be greater than the negative value of the total $(I_1+I_2)$ of the identifiers and when the accumulated value $\Sigma Di$ of the difference between the code lengths is equal to or less than 0, the coding mode is changed over to the uncompressed mode.

$$-I_1 - I_2 \leq \sum_{i=k}^{N} Di \leq 0 \quad (8)$$

(3) Uncompressed code

When the preceding coding mode is the uncompressed mode, if the accumulated value $\Sigma Di$ of the difference between the code word lengths is greater than 0, the coding mode is set to the uncompressed mode. That is the coding mode is not altered.

$$\sum_{i=k}^{N} Di > 0 \quad (9)$$

In other words, only when the condition of the compressed mode of Article 1 above is satisfied, the coding mode is changed to the compressed mode.

(3a-2) When the preceding mode is the compressed mode (1) Compressed mode

When the preceding mode is the compressed mode, if the accumulated value $\Sigma Di$ of the difference between the code word lengths is equal to or less than 0, the coding mode is set to the compressed mode. That is the coding mode is not altered.

$$\sum_{i=k}^{N} Di \leq 0 \quad (10)$$

(2) Reservation

When the preceding mode is the compressed mode, if the accumulated value $\Sigma Di$ of the difference between the code word lengths is equal to or less than the total $(I_1+I_2)$ and when the accumulated value $\Sigma Di$ of the difference between the code word lengths is equal to or less than 0, the coding mode is reserved in the compressed mode.

$$0 \leq \sum_{i=k}^{N} Di \leq +I_1 + I_2 \quad (11)$$

(3) Uncompressed mode

When the preceding mode is the compressed mode, if the accumulated value $\Sigma Di$ of the difference between the code word lengths is greater than the total $(I_1+I_2)$, the coding mode is reserved in the uncompressed mode.

$$+I_1 + I_2 < \sum_{i=k}^{N} Di \quad (12)$$

In other word, only when the condition of the uncompressed mode of Article 3 above is satisfied, the coding mode is changed to the uncompressed mode.

When the expression 6 is satisfied and the preservation period is to be terminated, the coding mode is determined in consideration of the history of the preceding coding mode as follows.

(3b-1) When the preceding mode is the compressed mode (1) Compressed mode

When the preceding mode is the compressed mode, if the difference between the code length $\Sigma[RL]i$ of the code obtained in the compressed mode and the code length $\Sigma[UC]i$ of the code obtained in the uncompressed mode is less than the bit length $I_1$ of the identifier employed for a change-over to the uncompressed mode, the coding mode is set to the compressed mode. That is, the coding mode is not changed.

$$\sum_{i=k}^{N} [UC]i + I_1 > \sum_{i=k}^{N} [RL]i \quad (13)$$

$$\sum_{i=k}^{N} [RL]i - \sum_{i=k}^{N} [UC]i < I_1 \quad (13')$$

(2) Uncompressed mode

When the preceding mode is the compressed mode, if the difference between the code length $\Sigma[RL]i$ of the code obtained in the compressed mode and the code length $\Sigma[UC]i$ of the code obtained in the uncompressed mode is greater than the bit length $I_1$ of the identifier employed for a change-over to the uncompressed mode, the coding mode is set to the uncompressed mode.

$$\sum_{i=k}^{N} [UC]i + I_1 \leq \sum_{i=k}^{N} [RL]i \quad (14)$$

$$\sum_{i=k}^{N} [RL]i - \sum_{i=k}^{N} [UC]i \geq I_1 \quad (14')$$

(3b-2) When the preceding mode is the uncompressed mode (1) Compressed mode

When the preceding mode is the uncompressed mode, if the difference between the code length $\Sigma[RL]i$ of the code obtained in the compressed mode and the code length $\Sigma[UC]i$ of the code obtained in the uncompressed mode is less than the bit length $I_2$ of the identifier employed for a change-over to the compressed mode, the coding mode is set to the uncompressed mode.

$$\sum_{i=k}^{N} [RL]i + I_2 \leq \sum_{i=k}^{N} [UC]i \quad (15)$$

$$\sum_{i=k}^{N} [RL]i - \sum_{i=k}^{N} [UC]i \leq -I_2 \quad (15')$$

(2) Uncompressed mode

When the preceding mode is the uncompressed mode, if the difference between the code length $\Sigma[RL]i$ of the code obtained in the compressed mode and the code length $\Sigma[UC]i$ of the code obtained in the uncompressed mode is greater than the bit length $I_1$ of the identifier employed for a change-over to the uncompressed mode, the coding mode is set to the uncompressed mode. That is, the coding mode is not varied.

$$\sum_{i=k}^{N}[RL]i + I_2 > \sum_{i=k}^{N}[UC]i \tag{16}$$

$$\sum_{i=k}^{N}[RL]i - \sum_{i=k}^{N}[UC]i > -I_2 \tag{16'}$$

Figure 3:
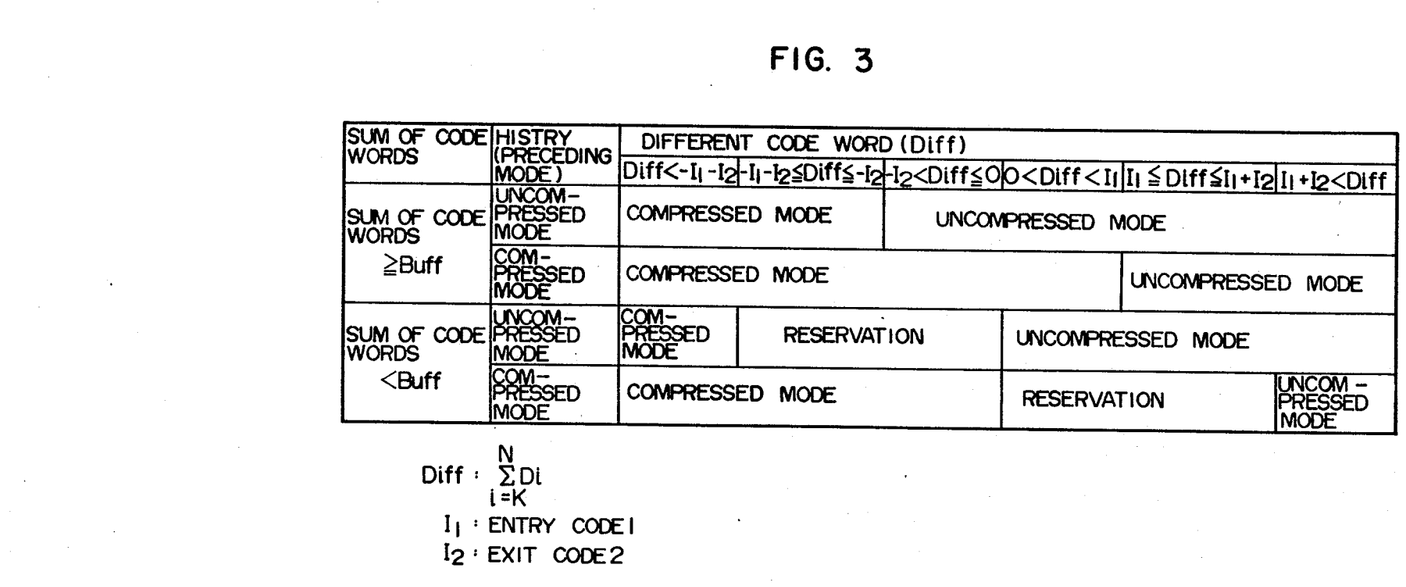
FIG. 3 is a schematic diagram showing the relationships between the judge conditions and the coding modes.

FIG. 3 briefly shows the relationships between the judge conditions and coding modes described above. Namely, in addition to the sequential accumulation of the difference of the code lengths associated with the respective modes, the code length itself of each mode is also accumulated and the history of the preceding mode is stored, which hence enables the conventional problem of the long reservation period to be suppressed.

In addition, when compared with the method in which the termination of the reservation is not provided like in the case of the conventional method, the deterioration of coding efficiency hardly takes place in this method.

More concretely, the decrease in the coding efficiency is as follows according to the results of experiments effected by use of a photograph portion (a female) of a test chart prepared for the facsimile (the Institute of Electronics and Communication Engineers of Japan):

The lowering of the coding efficiency in this method can be set to 0.5% or less by using a buffer having a capacity of only 64 bits.

In this case, the clustered-dot ordered dither method is employed as the dither method.

BRIEF DESCRIPTION OF THE DRAWINGS

These and other objects and advantages of the present invention will become apparent by reference to the following description and drawings wherein.

DESCRIPTION OF THE PREFERRED EMBODIMENTS

Figure 1A:
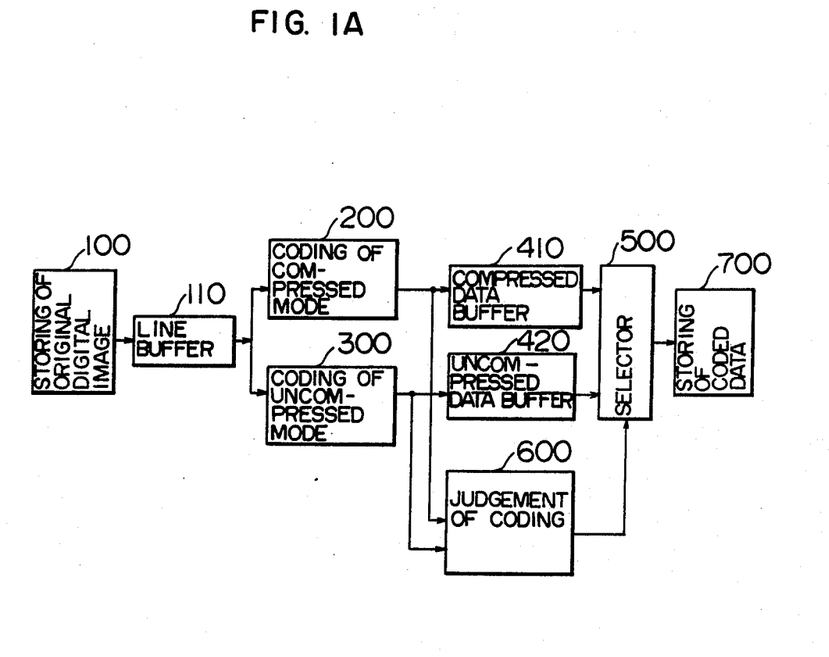
FIG. 1A is a functional block diagram showing a coding system of document image data as a first embodiment according to the present invention.

Description will now be given of an embodiment of the present invention with reference to the drawings. FIG. 1 is a functional block diagram showing a coding system of document image data as a first embodiment according to the present invention.

The functional configuration of this system includes an original data store section 100 for storing document image data, a line buffer 110 for temporarily buffering several lines of original data from the original data store section 100, a compressed mode coding section 200 for effecting the coding in the compressed mode, an uncompressed mode coding section 300 for effecting the coding in the uncompressed mode, a compressed data buffer 410 for temporarily buffering the code data obtained through the coding in the compressed mode, an uncompressed data buffer 420 for temporarily buffering the code data obtained through the coding in the uncompressed mode, a selector 500 for changing over between data items respectively from the data buffers 410 and 420, a coding mode judge section 600 for judging the most suitable coding mode based on the code data associated with the respective coding modes, and a code data store section 700.

Figure 1B:
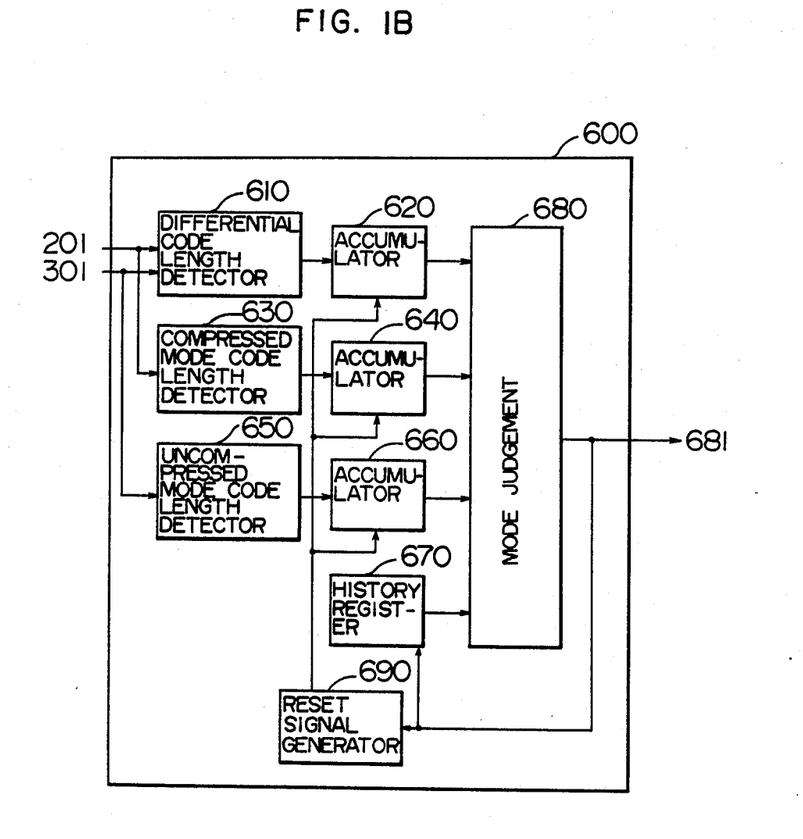
FIG. 1B is a functional block diagram showing a coding mode judge section of the first embodiment according to the present invention.

FIG. 2 is a detailed functional block diagram of the coding mode judge section 600 as the basic portion of the present invention for judging the most suitable coding mode. The coding mode judge section 600 includes a code length difference detect section 610 for detecting the difference between the code lengths of the codes related to the respective coding modes, an accumulator 620 for accumulating the value obtained as a result of the code length difference detection, a compressed code length detect section 630 for detecting the length of the code in the compressed mode, an accumulator 640 for accumulating the value obtained as a result of the compressed code length detection, an uncompressed code length detect section 650 for detecting the length of the code in the uncompressed mode, an accumulator 660 for accumulating the value obtained as a result of the uncompressed code length detection, a history keep section 670 for storing the history of the preceding coding modes, a change-over judge section 680 for judging the coding mode based on the results from the accumulators 620, 640, and 660 and the history keep section 670, and a reset signal generator 690 for initializing the respective accumulators for the next judgment when the change-over judgment is determined.

Prior to the detailed description of the present invention, the flow of the coding method will be first briefly described.

A document image is read by use of a document input device or unit such as a scanner and is stored as a binary image in the original data storage 100. In order to conduct the coding operation, a plurality of lines of data is transferred from the original data storage 100 to the line buffer 110.

In a facsimile apparatus, an image signal of a document image obtained through a photoelectric conversion is binarized and is then directly transferred to the line buffer 110 in some cases.

While receiving the original data from the line buffer 110, the coding sections 200 and 300 respectively achieve the coding operations. As the coding operations, it is possible to employ the facsimile coding method for the facsimile of group 3 (G3) or group 4 (G4) recommended by the CCITT.

Here, description will be given of a case where the coding method of the group 4 (G4) stipulated by the recommendation T.6 is used for the coding operation. The similar processing is also possible by employing the coding method of the group 3 (G3) stipulated in the recommendation T.4.

The facsimile coding method stipulated for the group 4 (G4) facsimile in the recommendation T.6 includes a basic facsimile coding method and an optional facsimile coding method. The basic facsimile coding method is a two-dimensional coding system and is ordinarily called an MR coding system. Furthermore, the optional facsimile coding method is stipulated for a binary black and white image as well as halftone and color images. In this specification, the present invention will be described by use of the optional facsimile coding method for the binary white and black image, namely, the uncompressed mode. The compression mode coding section 200 achieves the coding operation based on the basic facsimile coding system (MR coding system) of the recommendation T.6.

In addition, the uncompressed mode coding section 300 conducts the coding operation based on the optional facsimile coding system, namely, the uncompressed mode.

The code data obtained by the coding operation effected by the compressed mode coding section 200 is temporarily stored in the compressed data buffer 410 to guarantee the delay of the judgement in the coding mode judge section 600. This also applies to the code data obtained through the uncompressed mode coding section 300. The selector 500 selects the code data of the most suitable coding mode based on a judge signal from the coding mode judge section 600 and transfers the coded data to the coded data storage 700.

Description will now be given in detail of the operation of the coding mode judge section 600 as the basic portion according to the present invention.

Input signals to be received by the coding mode judge section 600 include compressed code data 201 coded in the compressed mode by the compressed mode coding section 200 and uncompressed code data 301 coded in the uncompressed mode by the uncompressed mode coding section 300. The code length difference detector 610 detects the difference between the code lengths of the compressed code data 201 and the uncompressed code data 301, respectively. For this purpose, the code length difference detector 610 includes an up-down counter operating with two input clocks. The compressed code data 201 and the uncompressed code data 301 are respectively supplied to an up signal input and a down signal input of the up-down counter. As a result, the counter produces code difference data 611 as an output, which is Di described above.

The accumulator 620 receives as an input thereto the difference data 611 outputted from the code length difference detector 610 so as to effect an addition of the difference data 611 for each run length of the original data. The result of the accumulation is the total difference data 621, which is represented as the difference between the code lengths as follows.

$$\sum_{i=k}^{N} Di$$

The compressed code length detector 630 is an ordinary counter which receives as an input thereto the compressed code data 201 so as to measure the length of the compressed code. The output result therefrom is accumulated like in the case of the code length difference detector 610. The result of the accumulation represents the accumulated compressed code data 641, which is expressed as the total of the code lengths as follows.

$$\sum_{i=k}^{N} [RL]i$$

Furthermore, the uncompressed code length detector 650 is an ordinary counter which receives as an input thereto the uncompressed code data 301 so as to measure the length of the uncompressed code. The output result therefrom is accumulated in the similar fashion as for the case of the code length difference detector 610. The result of the accumulation is the accumulated uncompressed code data 661, which is represented as the total of the code lengths as follows.

$$\sum_{i=k}^{N} [UC]i$$

The history keep section 670 is used to keep the previous judge result 671.

The mode change-over or switch judgement is conducted depending on the results 621, 641, and 661 from the respective accumulator 620, 640, and 660 and information of the previous judge results 671. The change-over judge result 681 indicates either one of the compressed mode and the uncompressed mode, namely, the reservation period is not outputted. This algorithm conforms to the judge conditions above and the coding modes as shown in FIG. 3.

Only when the change-over judge result 681 is outputted, the reset signal generate circuit 690 initializes the respective accumulators 620, 640, and 660, namely, the accumulated results are respectively reset to zero.

Figure 2A:
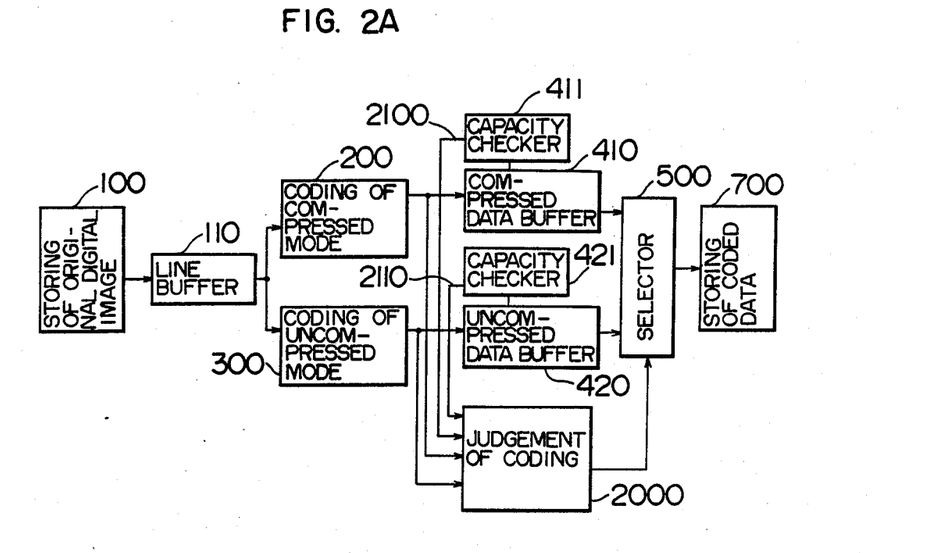
FIG. 2A is a functional block diagram showing a coding system of document image data as a second embodiment according to the present invention.

FIG. 2A is a functional block diagram of a coding system of document image data as the second embodiment according to the present invention.

In the first embodiment, the code length in the reservation period is obtained by coding the data in the respective methods so as to accumulate the obtained code; however, in the second embodiment, the code length of the reservation period is attained by use of the accumulated amount in the data buffer temporarily storing therein the coded data.

That is, the difference in the configuration between the first and second embodiments resides in that there are provided means 411 and 421 for measuring the accumulated amount in the data buffer.

The results 2100 and 2110 of the measurement are transferred to the coding mode judge section 2000.

Figure 2B:
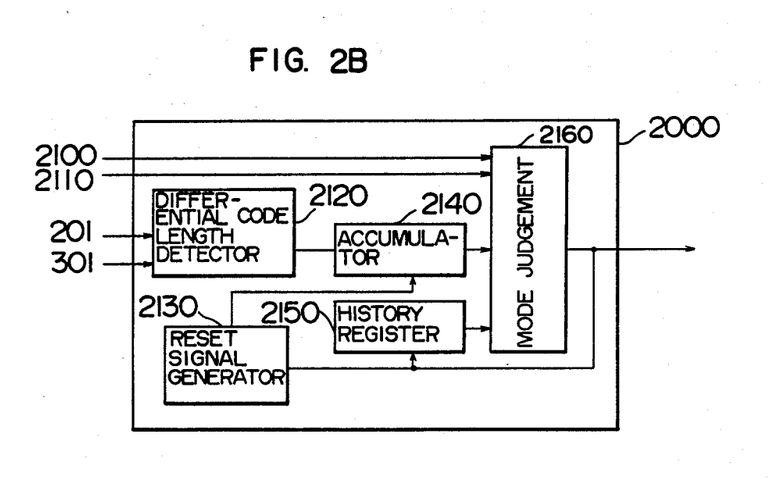
FIG. 2B is a functional block diagram showing a coding mode judge section of the second embodiment according to the present invention.

FIG. 2B shows the coding mode judge section 2000 in detail.

The coding mode judge section 2000 effects processing of which the method is substantially identical to the processing method of the coding mode judge section 600 of the first embodiment. The difference of this method resides in that the code length in the reservation period is obtained by use of the capacity of the data buffer as compared with the operation of the first embodiment in which the code length is obtained through an accumulation.

In FIG. 2B, reference numerals 2100 and 2110 respectively indicate the values of the data buffer capacity. In this configuration, the other constituent components are the same as those of FIG. 1B.

As can be seen from FIG. 3, all values of the total code word length are not necessarily required, namely, it is only necessary that whether or not a value is less than a threshold value (Buff). For this purpose, it may also be possible to set the sizes of the data buffers 410 and 420 to the threshold value (Buff) so as to detect whether or not the data buffers are completely filled up with data.

Figure 4:
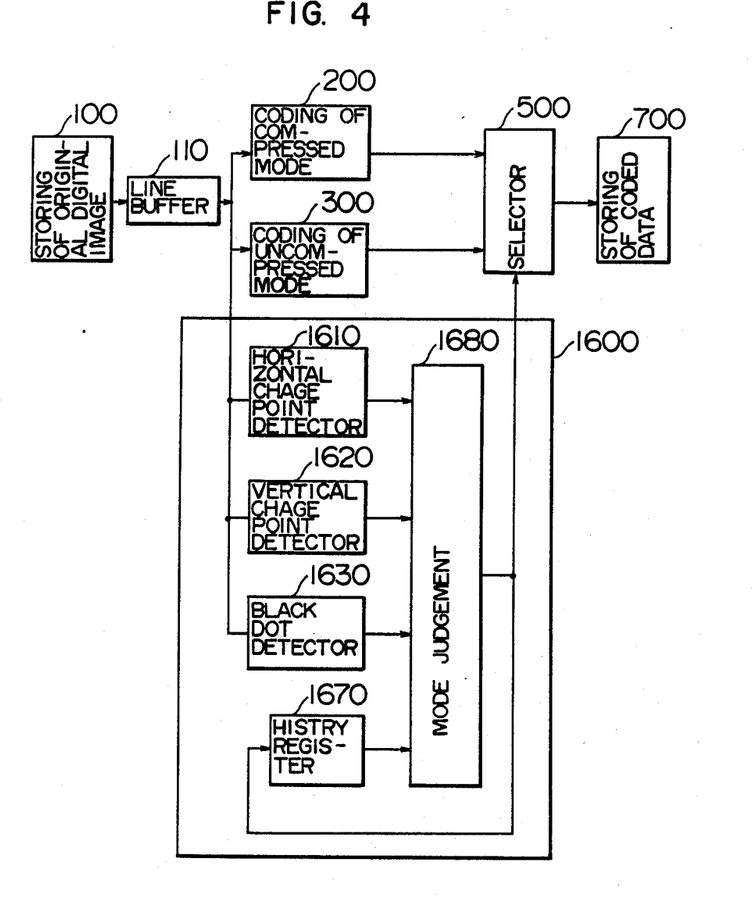
FIG. 4 is a functional block diagram showing a coding system of document image data as a third embodiment according to the present invention.

FIG. 4 is a functional block diagram showing a coding system of document image data as the third embodiment according to the present invention.

In this embodiment, the coding mode judge method is associated with a characteristic detection by use of a characteristic of an image. Since there is not used the conventional characteristic of a combination of run lengths in this system, namely, an inherent characteristic of a dithered image is employed for the judgement; in consequence, for the judgement, there is not imposed any restrictions on the dither method. The characteristic quantities or characteristics adopted in this embodiment are as follows.

(1) Number of change points in the horizontal direction (2) Number of change points in the vertical direction (3) Number of black points Moreover, the preceding history is also taken into consideration.

There exist the following different points with respect to the first embodiment. First, the data buffers 410 and 420 are not disposed between the compressed mode coding section 200 and the selector 500. Second, the most suitable coding mode is judged depending on the original data prior to the coding operation.

Description will now be given in detail of the coding mode judge section 1600 as the basic portion of the present invention to judge the most suitable coding mode. The coding mode judge section 1600 conducts judgement by referencing the original data of an image from the line buffer 110 accommodating a plurality of lines. The dimension of the reference area adopted for the judgement is a rectangle having a horizontal length M and a vertical length L. Ordinarily, the reference area for the judgement ranges from 16×2 to 24×2. The horizontal change point detect section 1610 is used to detect the number of points where the color is changed in the original data between white and black along the horizontal direction in the reference area. The vertical change point detect section 1620 is employed to detect the number of points where the color is changed in the original data between white and black along the vertical direction in the reference area. The black dot detect section 1670 detects the number of black points in the reference area. The change-over judge section 1680 operating based on a characteristic detection by use of the characteristics of the image conduct judgement for the change-over mode based on the three characteristics and the preceding history.

Figure 5:
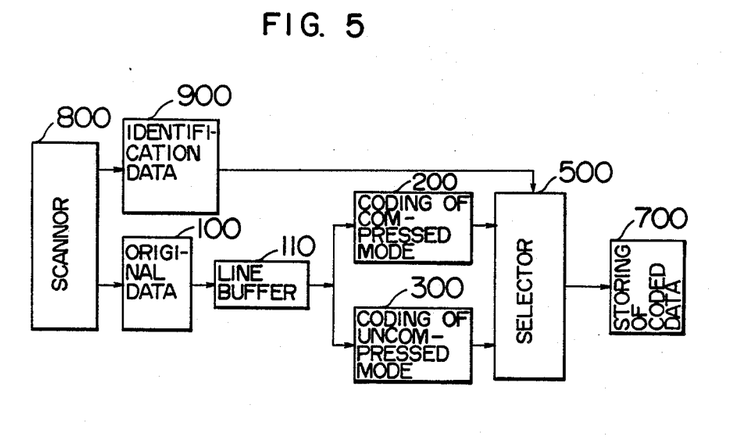
FIG. 5 is a functional block diagram showing a coding system of document image data as a fourth embodiment according to the present invention.

FIG. 5 is a functional block diagram showing a coding system of document image data as the fourth embodiment according to the present invention.

In this embodiment, the coding mode is not judged based on the binarized original data or the coded data, namely, the coding mode is identified by use of another means. The identification results therefrom is accumulated as identification data 900 in the similar fashion as for the original data so as to be used for the coding mode judgement.

This method is particularly effective in a case where a document image is inputted by use of an image scanner 800 having a function to automatically determining a photograph area.

As the method of automatically determining the photograph area, it is possible to use the method described in the U.S. Pat. No. 208116 (filed on June 17th, 1988) of the present inventor.

Figure 6:
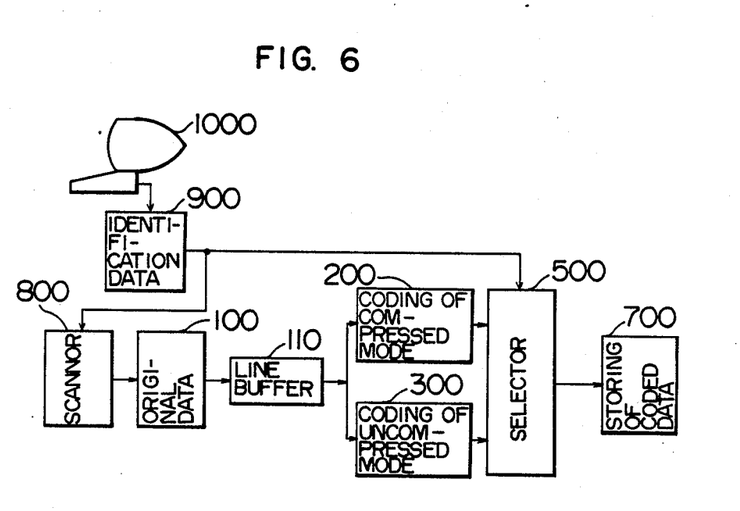
FIG. 6 is a functional block diagram showing a coding system of document image data as a fifth embodiment according to the present invention.

FIG. 6 is a functional block diagram showing a coding system of document image data as the fifth embodiment according to the present invention.

In this method, the photograph area is not automatically determined, and this method is particularly effective to input documents of which each document includes a photograph at a particular location thereof, for example, a personal history.

A position of a photograph or the like is inputted by use of a specified position entry or input apparatus 1000.

Figure 7:
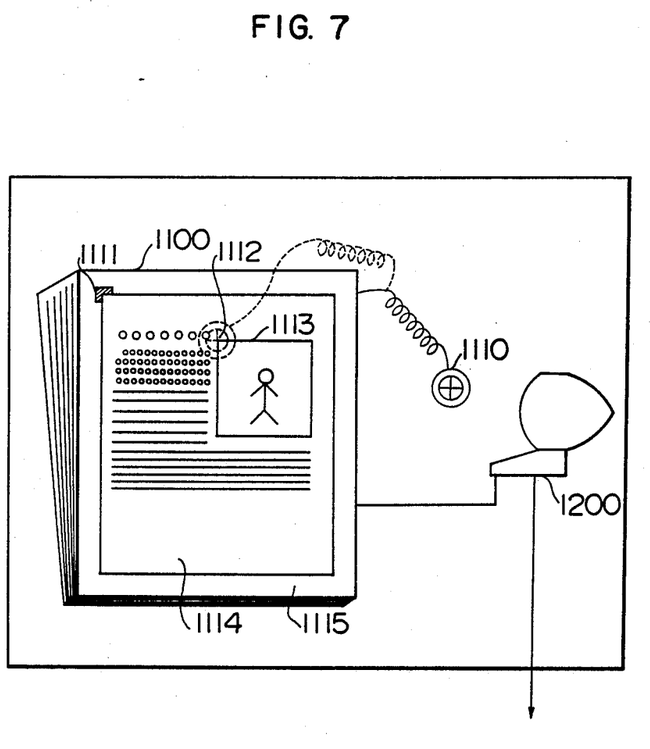
FIG. 7 is a schematic diagram showing in detail an input device for inputting a specified position in the fifth embodiment according to the present invention.

FIG. 7 shows in detail the specified position input apparatus 1000. The position input apparatus 1000 includes a position entry or input controller 1200 and a position entry or input panel 1100. The position input controller 1200 supplies a scanner 800 and a selector 500 with indication data from the position input panel 1100 as identification the position input panel 1100 includes a pointer 1110 for specifying a position on a document and a board 1115 on which the document 1114 is attached.

When a position of a photograph is specified, the document 1114 is mounted on the board 1115 by use of an origin 1111 of the board 1115 as the reference point. Thereafter, the position of the photograph on the document 1114 is indicated by the pointer 1110, which is achieved by specifying with the pointer the upper-left point 1112 and the lower-right point 1113 of the photograph.

As described above, according to the coding system of the present invention, there is removed the restriction as the conventional problem that the document image is limited; furthermore, the delay of the judgement of the coding mode can be guaranteed not to exceed a predetermined period of time. In consequence, according to the coding system of the present invention, the delay of the encoding operation is minimized and the capacity of the buffer memory to store the coded data can be reduced.

Since limitations imposed on the document image to be coded are removed, an arbitrary method can be adopted as the dither method of the document image.

In consequence, a document image including a photograph can be coded with a high quality.

We claim:

1. A picture coding system for a document image comprising:
   (1) document image data store means for storing therein document image data to be coded conforming to a predetermined coding method, said document image data including data to be coded in a compressed mode and data to be coded in an uncompressed mode;
(2) compressed mode coding means for effecting a predetermined coding on the document image data in the compressed mode;
(3) uncompressed mode coding means for effecting a predetermined coding on the document image data in the uncompressed mode, the coding operation in the uncompressed mode and the coding operation in the compressed mode being concurrently conducted;
(4) coding mode judge means for determining a mode in which the document image data is to be coded including:
  (a) means for respectively accumulating a code length of coded data coded by said compressed mode coding means and a code length of coded data coded by said uncompressed mode coding means;
  (b) means for respectively accumulating a difference between the code lengths of the coded data respectively coded by said compressed mode coding means and said uncompressed mode coding means; and
  (c) means for keeping therein a history of selection results of preceding coding modes, thereby determining the coding mode based on output results respectively produced from said means (a), (b), and (c); and
(5) select means for selecting either one of the outputs respectively supplied from said compressed mode coding means and said uncompressed mode coding means depending on the coding mode determined by said coding mode judge means.

2. A picture coding system for a document image according to claim 1 wherein said document image store means includes a line buffer for temporarily storing therein a plurality of lines of data.

3. A picture coding system for a document image according to claim 1 wherein said compressed mode coding means and said uncompressed mode coding means respectively include a compressed data buffer and an uncompressed data buffer for temporarily storing therein a plurality of lines of data, respectively.

4. A picture coding system for a document image according to claim 3 wherein said code length accumulate means of said coding mode judge means includes means for detecting whether or not coded data respectively stored in said compressed data buffer and said uncompressed data buffer are less than capacity values of said compressed and uncompressed data buffers, respectively.

5. A picture coding system for a document image according to claim 1 wherein said code length accumulate means of said coding mode judge means includes means for detecting code lengths of the coded data respectively coded by said compressed mode coding means and said uncompressed mode coding means, respectively.

6. A picture coding system for a document image according to claim 1 wherein said code length difference accumulate means of said coding mode judge means includes means for detecting a difference between the code lengths of the coded data respectively coded by said compressed mode coding means and said uncompressed mode coding means, respectively.

7. A picture coding system for a document image according claim 1 wherein said coding mode judge means further includes means for resetting values accumulated in said code length accumulate means and said code length difference accumulate means.

8. A picture coding system for a document image according to claim 1 wherein said coding mode judge means effects the determination of the mode such that:
  (I) when the code length exceeds a predetermined value and
    (i) when a preceding mode is the uncompressed mode, the compressed mode is determined if
    $$\text{Diff} < -I_1 - I_2$$
    or
    $$-I_1 - I_2 \leq \text{Diff} \leq -I_2$$
    and the uncompressed mode is determined if
    $$-I_2 < \text{Diff} \leq 0$$
    $$0 < \text{Diff} < I_1$$
    $$I_1 \leq \text{Diff} \leq I_1 + I_2$$
    $$I_1 + I_2 < \text{Diff}$$
    (ii) when the preceding mode is the compressed mode, the compressed mode is determined if
    $$\text{Diff} < -I_1 - I_2$$
    $$-I_1 - I_2 \leq \text{Diff} \leq -I_2$$
    $$-I_2 \leq \text{Diff} \leq 0$$
    $$0 < \text{Diff} < I_1$$
    and the uncompressed mode is determined if
    $$I_1 \leq \text{Diff} \leq I_1 + I_2$$
    $$I_1 + I_2 < \text{Diff}$$
  (II) when the code length is at most a predetermined value and
    (i) when a preceding mode is the uncompressed mode, the compressed mode is determined if
    $$\text{Diff} < -I_1 - I_2$$
    the reservation is determined if
    $$-I_1 - I_2 \leq \text{Diff} \leq -I_2$$
    $$-I_2 < \text{Diff} \leq 0$$
    and the uncompressed mode is determined if
    $$0 < \text{Diff} < I_1$$
    $$I_1 \leq \text{Diff} \leq I_1 + I_2$$
    $$I_1 + I_2 < \text{Diff}$$
    (ii) when the preceding mode is the compressed mode, the compressed mode is determined if
    $$\text{Diff} < -I_1 - I_2$$
    $$-I_1 - I_2 \leq \text{Diff} \leq -I_2$$

$$-I_2 < \text{Diff} \leq 0$$

the reservation is determined if $$0 < \text{Diff} < I_1$$

$$I_1 \leq \text{Diff} \leq I_1 + I_2$$

and the uncompressed mode is determined if $$I_1 + I_2 < \text{Diff}$$

where, Diff indicates a difference between code lengths, $I_1$ stands for a bit count of an identifier employed for a change-over to the uncompressed mode, and $I_2$ designates a bit count of an identifier employed for a change-over to the compressed mode.

9. A picture coding system for a document image data in which a plurality of picture coding methods are subjected to a selection such that document image data is converted so as to obtain an identification code representing the selected coding method and signals obtained by coding the data comprising:
   means for detecting and for accumulating code lengths of the codes converted in the respective coding methods;
   means for detecting and for accumulating a difference between the lengths of the respective codes obtained by the conversion effected in the coding methods;
   means for storing therein a history of a result of the selection of the preceding coding method; and
   Change-over judge means for selecting one of the plural coding methods based on information obtained from said three kinds of means.

10. A picture coding system for a document image data in which a plurality of picture coding methods are subjected to a selection such that document image data is converted so as to obtain an identification code representing the selected coding method and signals obtained by coding the data comprising:
    buffer memory means for temporarily storing therein the codes converted in the respective coding methods;
    means for detecting an amount of coded data stored in each said buffer memory means;
    means for detecting a difference between the amounts of the coded data respectively stored in said buffer memory means due to a difference between the coding methods;
    means for storing therein a history of the selection of the preceding coding methods; and
    change-over judge means for selecting one of the plural coding methods based on information obtained from said three kinds of means.

11. A picture coding system for a document image data in which a plurality of picture coding methods are subjected to a selection such that document image data is converted so as to obtain an identification code representing the selected coding method and signals obtained by coding the data comprising:
    means disposed as means for judging characteristics of a document image for detecting a change point of runs of consecutive black or white elements in a scanning line of the document image, a change point of runs of consecutive black or white elements in a vertical direction, and the number of black pixels in the vertical direction;
    means for storing therein a history of the selection of the preceding coding methods; and
    change-over judge means for selecting one of the plural coding methods based on information obtained from said means.

12. A picture coding system for a document image data in which a plurality of picture coding methods are subjected to a selection such that document image data is converted so as to obtain an identification code representing the selected coding method and signals obtained by coding the data comprising:
    means for generating, prior to a coding processing, information to be employed to select one of the plural coding methods; and
    change-over judge means for selecting one of the plural coding methods based on information obtained from said means.

13. A picture coding system for a codument image data according to claim 11 further including:
    means for supplying, prior to a coding processing, information representing characteristics of the document image; and
    means for changing the characteristics associated with the change-over judge means based on the information representing characteristics of the document image.

* * * * *